June 2, 1953    W. M. WREATHALL    2,640,393
REFLECTING OPTICAL OBJECTIVE
Filed March 7, 1952
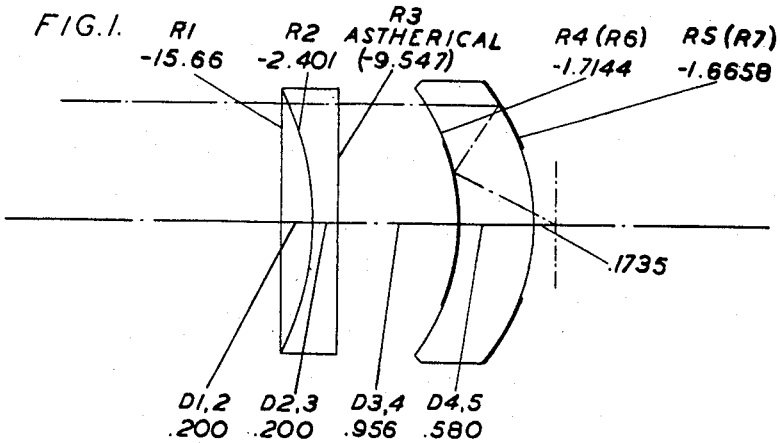
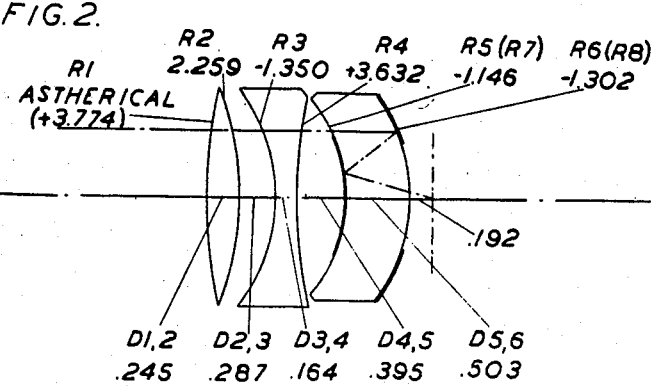
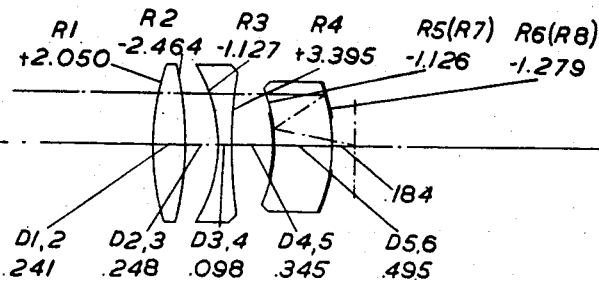
Inventor
William Michael Wreathall
By Emery Holcombe y Blair
Attorney Patented June 2, 1953

2,640,393

UNITED STATES PATENT OFFICE 2,640,393

REFLECTING OPTICAL OBJECTIVE

William Michael Wreathall, Leicester, England, assignor to Taylor, Taylor & Hobson Limited, Leicester, England, a British company Application March 7, 1952, Serial No. 275,283
In Great Britain March 9, 1951

14 Claims. (Cl. 88—57)

This invention relates to an optical objective, more especially for photographic or radiographic purposes, corrected for spherical and chromatic aberrations, coma, astigmatism and field curvature. Known objectives of high aperture suffer from a number of disadvantages, which it is the object of the present invention to overcome. In particular, objectives consisting entirely of refracting members have only been made to cover a comparatively small angular field at apertures greater than, say, F/1.0, except when correction for field curvature is sacrificed. High apertures are also obtainable from the combination of a spherically curved reflector and an aspherical corrector plate, commonly known as a Schmidt system, but again the focal surface is necessarily curved and is moreover disadvantageously situated in the middle of the objective. The combination of the two spherical reflectors and one or more corrector plates, known as a Schmidt Cassegrain system, enables a flat field to be obtained, but if this is to be external to the objective the upper limit of the aperture is about F/1.0.

It has been proposed, in certain U. S. patent specifications relating to Schmidt Cassegrain systems, and especially in U. S. patent specifications Nos. 2,336,379 and 2,380,887, to mount the two reflectors on opposite faces of a single piece of glass, thus ensuring that they are rigidly fixed in the correct relative positions and that no obstructing support is necessary for the concave reflector and space is not taken up to the rear of the objective by a support for such reflector. In addition, since the reflecting surfaces are internally reflecting they can readily be protected against atmospheric attack.

In such prior known arrangement, the incident and emergent portions of the surfaces of such supporting piece of glass were designed so as not to deviate rays passing through an axial image point.

The present invention may be regarded as a further development of this known arrangement, wherein use is made of the incident and emergent surfaces to improve the corrections of the objective, and more especially to raise the aperture to F/0.8 or higher and to cover a flat field of semi-angle greater than 15 degrees, with the focal plane to the rear of the objective. The arrangement according to the invention has the further advantage of being simpler to manufacture than the prior known arrangement.

The objective according to the invention comprises a front refracting member separated by an air space from a rear member of meniscus form with its spherical air-exposed surfaces concave to the front, the front surface of the rear member having its central portion coated with reflecting material and the rear surface of such member having an annular outer zone similarly coated, so that light entering the objective through the front member will be refracted at the curved outer zone of the front surface of the rear member and then after two internal reflections respectively at the outer zone of the rear surface and at the central zone of the front surface will emerge from the rear member by refraction at the curved central zone of the rear surface thereof.

It should be made clear that the terms "front" and "rear" are used herein, in accordance with the usual convention, to relate to the sides of the objective respectively nearer to and further from the longer conjugate.

The paraxial power of the front member is preferably less than .25 times that of the whole objective.

The curvatures of the front and rear surfaces of the rear member are preferably such that their numerical sum lies between 1.0 and 2.0 times the equivalent power of the objective and their numerical difference is less than .30 times such equivalent power.

The axial air separation between the rear surface of the front member and the front surface of the rear member may conveniently be less than 1.2 times the equivalent focal length of the objective. The axial thickness of the rear member conveniently lies between .25 and .70 times such equivalent focal length. The rear member is preferably made of material having Abbé V number greater than 50.

In one convenient arrangement, the front member consists of a single compound component comprising a convergent element made of material having Abbé V number less than 45 cemented to a divergent element made of material having Abbé V number greater than 50. Preferably, in this arrangement, one of the surfaces of the front member is aspherical and consists of a surface of revolution generated by rotation about the X-axis (that is the optical axis of the objective) of a curve of the form $$x = a_2 y^2 + a_4 y^4 + \ldots + \text{(higher even powers of } y\text{)}$$

wherein the coefficients $a_2, a_4 \ldots$ are constants determining the extent of departure from the tangent plane at the vertex of the surface. For the purposes of the present invention, the constants $a_2$ and $a_4$ preferably lie respectively between $+.5/F$ and $-.5/F$ and between $+.25/F^3$ and $-.25/F^3$, where F is the equivalent focal length of the objective.

In an alternative arrangement, correction is afforded also for distortion and for oblique chromatic aberration, without impairing the correction of the other aberrations. This arrangement also makes it possible in certain instances to dispense with the necessity for having an aspherical correcting surface, but at the expense of a reduction in aperture for example F/1.2.

In this alternative arrangement, the front member consists of two simple components separated by an air space, the front component being convergent and the rear component divergent.

The simple convergent component is preferably made of material having Abbé V number less than 50. The rear surface of the front component and the front surface of the rear component of the front member are preferably concave to the front and the latter is more deeply curved than the other surfaces of the front member.

One of the surfaces of the front member may be aspherical, as in the first arrangement, or alternatively it is possible, at the expense of some loss of aperture, to employ spherical surfaces throughout the objective.

Figures 1, 2 and 3 of the accompanying drawings respectively illustrate three convenient practical examples of objective according to the invention.

Numerical data for these examples are given in the following tables, in which $R_1, R_2 \ldots$ represent the radii of curvature of the individual surfaces, the negative sign indicating that the surface is concave to the front, and $D_{1,2}, D_{2,3} \ldots$ represent the axial distances between the surfaces $R_1 R_2$, $R_2 R_3 \ldots$ the positive sign in this case indicating that the first of the two surfaces is in front of the second whilst the negative sign indicates that the second of the two surfaces is in front of the first. The tables also give the mean refractive index $n_D$ for the D-line and the Abbé V number of the material used for each element of the objective. The insertion of equals (=) signs in the radius columns of the tables, in company with plus (+) and minus (−) signs which indicate whether the surface is convex or concave to the front, is for conformity with the usual Patent Office custom, and it is to be understood that these signs are not to be interpreted wholly in their mathematical significance. This sign convention agrees with the mathematical sign convention required for the computation of some of the aberrations including the primary aberrations, but different mathematical sign conventions are required for other purposes including computation of some of the secondary aberrations, so that a radius indicated for example as positive in the tables may have to be treated as negative for some calculations as is well understood in the art.

EXAMPLE I

Equivalent focal length 1.000

| Radius | Thickness or Air Separation | Refractive Index $n_D$ | Abbé V Number |
|---|---|---|---|
| $R_1 = -15.66$ | | | |
| | $D_{1,2} = +.200$ | 1.605 | 38.0 |
| $R_2 = -2.401$ | | | |
| | $D_{2,3} = +.200$ | 1.612 | 58.5 |
| $R_3 =$ aspherical | | | |
| | $D_{3,4} = +.956$ | | |
| $R_4 = -1.7144$ | | | |
| | $D_{4,5} = +.580$ | 1.612 | 58.5 |
| $R_5 = -1.6658$ | | | |
| | $D_{5,6} = -.580$ | 1.612 | 58.5 |
| $R_6 = -1.7144$ | | | |
| | $D_{6,7} = +.580$ | 1.612 | 58.5 |
| $R_7 = -1.6658$ | | | |

Coordinates of generating curve of aspherical surface $R_3$

| $y$ | $x$ | $y$ | $x$ |
|---|---|---|---|
| .30045 | −.004238 | .60088 | −.010001 |
| .35048 | −.005508 | .65120 | −.009496 |
| .40051 | −.006801 | .70164 | −.007994 |
| .45055 | −.008026 | .75209 | −.005072 |
| .50060 | −.009039 | .80193 | −.002151 |
| .55071 | −.009756 | .84820 | +.007095 |

Paraxial radius of aspherical surface $R_3$, −9.547.
Front conjugate distance, 15.66.
Rear conjugate distance, .1735.
Magnification, ×16.

The coordinates set out in this table for the generating curve of the aspherical surface $R_3$ are derived from the equation $$x = -.05237 y^2 + .0584 y^4 + \ldots \text{ higher order terms}$$

The surface $R_6$ is, of course, identical with the surface $R_4$ and the surface $R_7$ with the surface $R_5$, $R_5$ and $R_6$ representing the reflecting zones on the surfaces and $R_4$ and $R_7$ the refracting zones. The diameter of the reflecting zone $R_6$ of the front surface of the rear member is 1.25 times the equivalent focal length of the objective, the outer diameter of the refracting zone of such surface being 2.00 times such equivalent focal length, whilst the diameter of the refracting zone of the rear surface is 1.15 times such equivalent focal length. The F/No. of the objective corresponding to the area of the annular aperture is F/0.76.

The front member is in the form of a convergent doublet, consisting of a convergent element cemented in front of a divergent element, and the paraxial power of this doublet is .023 times the equivalent power of the objective. The aspherical rear surface of this member is concave to the front in the neighbourhood of the axis, the radius of the osculating sphere being 9.547 times the equivalent focal length of the objective.

The curvatures of the front and rear surfaces of the rear member are respectively .583 and .600 times the equivalent power of the objective, so that the sum and the difference of these curvatures are 1.183 and .017 times such equivalent power respectively.

This example is well corrected for field curvature, as well as for spherical and chromatic aberrations, coma, and astigmatism and covers a semi-angular field of about 20 degrees.

EXAMPLE II

*Equivalent focal length 1.000*

| Radius | Thickness or Air Separation | Refractive Index $n_D$ | Abbé V Number |
|---|---|---|---|
| $R_1$=aspherical | $D_{1,2}$=+.245 | 1.6205 | 36.2 |
| $R_2$=−2.259 | $D_{2,3}$=+.287 | | |
| $R_3$=−1.350 | $D_{3,4}$=+.164 | 1.5303 | 51.2 |
| $R_4$=+3.632 | $D_{4,5}$=+.395 | | |
| $R_5$=−1.146 | $D_{5,6}$=+.503 | 1.6910 | 54.8 |
| $R_6$=−1.302 | $D_{6,7}$=−.503 | 1.6910 | 54.8 |
| $R_7$=−1.146 | $D_{7,8}$=+.503 | 1.6910 | 54.8 |
| $R_8$=−1.302 | | | |

*Coordinates of generating curve of aspherical surface $R_1$*

| y | x |
|---|---|
| .8175 | +.06806 |
| .7078 | +.05592 |
| .6025 | +.04290 |
| .4999 | +.03075 |
| .3989 | +.02015 |
| .2987 | +.01154 |

Paraxial radius of aspherical surface $R_1$, +3.774.
Front conjugate distance, 12.48.
Rear conjugate distance, .192.
Magnification, ×12.55.

The coordinates set out in this table for the generating curve of the aspherical surface $R_1$ are derived from the equation $$x = +.1325y^2 - .0352y^4 + \ldots \text{ higher order terms}$$

EXAMPLE III

*Equivalent focal length 1.000*

| Radius | Thickness or Air Separation | Refractive Index $n_D$ | Abbé V Number |
|---|---|---|---|
| $R_1$=+2.050 | $D_{1,2}$=+.241 | 1.5786 | 41.1 |
| $R_2$=−2.464 | $D_{2,3}$=+.248 | | |
| $R_3$=−1.127 | $D_{3,4}$=+.098 | 1.5303 | 51.2 |
| $R_4$=+3.395 | $D_{4,5}$=+.354 | | |
| $R_5$=−1.126 | $D_{5,6}$=+.495 | 1.691 | 54.8 |
| $R_6$=−1.279 | $D_{6,7}$=−.495 | 1.691 | 54.8 |
| $R_7$=−1.126 | $D_{7,8}$=+.495 | 1.691 | 54.8 |
| $R_8$=−1.279 | | | |

Front conjugate distance, 11.40.
Rear conjugate distance, .184.
Magnification, ×11.42.

In both these examples, the surfaces $R_5$ and $R_7$ are identical as also are $R_6$ and $R_8$, $R_6$ and $R_7$ representing the reflecting zones and $R_5$ and $R_8$ the refracting zones. The inner and outer diameters of the refracting zone $R_5$ of the front surface of the rear member are respectively .91 and 1.49 in Example II, and .46 and .88 in Example III, in each case in terms of the equivalent focal length. The outer diameter of the refracting zone $R_8$ of the rear surface is .82 times the equivalent focal length in Example II and .39 times the equivalent focal length in Example III. The F/No. of the objective is approximately F/0.8 in Example II and F/1.2 in Example III, the surfaces in Example III all being spherical.

The front member in each example consists of a simple convergent component in front of a simple divergent component, and has divergent paraxial power. In Example II the power of the front member is .025 times that of the whole objective whilst in Example III the corresponding figure is .013. The aspherical surface $R_1$ in Example II is convex to the front in the neighbourhood of the axis, the radius of the osculating sphere being 3.774 times the equivalent focal length of the objective.

The curvatures of the front and rear surfaces of the rear member are respectively .873 and .768 in Example II and .888 and .782 in Example III, so that the sum and the difference of these curvatures are respectively 1.641 and .105 in Example II and 1.670 and .106 in Example III, these figures being given in terms of the equivalent power of the objective.

These two examples are well corrected for all the primary aberrations, including distortion, and also for oblique chromatic aberration, and the semi-angular field covered is about 17 degrees in each case.

What I claim as my invention and desire to secure by Letters Patent is:

1. An optical objective, corrected for spherical and chromatic aberrations, coma, astigmatism and field curvature, and comprising a front refracting member including a convergent element and a divergent element, and a rear member separated by an air space therefrom and of meniscus form with its spherical air-exposed surfaces concave to the front, the front surface of the rear member having its central portion coated with reflecting material and the rear surface of such member having an annular outer zone similarly coated, so that light entering the objective through the front member will be refracted at the curved outer zone of the front surface of the rear member and then after two internal reflections respectively at the outer zone of the rear surface and at the central zone of the front surface will emerge from the rear member by refraction at the curved central zone of the rear surface thereof, the curvatures of the front and rear surfaces of the rear member being such that their sum lies between 1.0/F and 2.0/F and their difference between zero and .30/F, while the axial thickness of the rear member lies between .25F and .70F, where F is the equivalent focal length of the objective.

2. An optical objective as claimed in claim 1, in which the paraxial power of the front member is numerically less than .25/F and those of the convergent and divergent elements thereof are each greater than .15/F.

3. An optical objective as claimed in claim 2, in which the axial air separation between the rear surface of the front member and the front surface of the rear member is less than 1.2F and greater than .05F.

4. An optical objective as claimed in claim 1, in which the front member has paraxial power numerically less than .25/F and consists of a single compound component having a convergent element cemented to a divergent element, the Abbé V number of the material of such convergent element being less than 45 whilst those of the divergent element and of the rear member are both greater than 50.

5. An optical objective as claimed in claim 1, in which one of the surfaces of the front member is aspherical and consists of a surface of revolution generated by rotation about the X- axis (that is the optical axis of the objective) of a curve of the form $$x = a_2 y^2 + a_4 y^4 + \ldots \text{ higher even powers of } y$$

where $a_2$ and $a_4$ are constants determining the extent of departure from the tangent plane at the vertex of the surface and lie respectively between $+.5/F$ and $-.5/F$ and between $+.25/F^3$ and $-.25/F^3$.

6. An optical objective, corrected for spherical and chromatic aberrations, coma, astigmatism and field curvature, and comprising a front refracting member consisting of a single compound component having a convergent element made of material with Abbé V number less than 45 cemented to a divergent element made of material with Abbé V number greater than 50, and a rear member separated from the front member by an air space and of meniscus form with its spherical air-exposed surfaces concave to the front, the front surface of the rear member having its central portion coated with reflecting material and the rear surface of such member having an annular outer zone similarly coated, so that light entering the objective through the front member will be refracted at the curved outer zone of the front surface of the rear member and then after two internal reflections respectively at the outer zone of the rear surface and at the central zone of the front surface will emerge from the rear member by refraction at the curved central zone of the rear surface thereof, the curvatures of the front and rear surfaces of the rear member being such that their sum lies between $1.0/F$ and $2.0/F$ and their difference between zero and $.30/F$, where F is the equivalent focal length of the objective.

7. An optical objective as claimed in claim 6, in which the axial air separation between the rear surface of the front member and the front surface of the rear member is less than $1.2F$ and greater than $.05F$, and the axial thickness of the rear member lies between .25 and .70 times the equivalent focal length of the objective.

8. An optical objective as claimed in claim 6, in which one of the surfaces of the front member is aspherical and consists of a surface of revolution generated by rotation about the X-axis (that is the optical axis of the objective) of a curve of the form $$x = a_2 y^2 + a_4 y^4 + \ldots \text{ higher even powers of } y$$

where $a_2$ and $a_4$ are constants determining the extent of departure from the tangent plane at the vertex of the surface and lie respectively between $+.5/F$ and $-.5/F$ and between $+.25/F^3$ and $-.25/F^3$.

9. An optical objective corrected for spherical and chromatic aberrations, coma, astigmatism, field curvature and distortion, and also for oblique chromatic aberrations, and comprising a front refracting member consisting of two air-separated simple components of which the front component is convergent and the rear component divergent, and a rear member air-separated from the front member and of meniscus form with its spherical air-exposed surfaces concave to the front, the front surface of the rear member having its central portion coated with reflecting material and the rear surface of such member having an annular outer zone similarly coated, so that light entering the objective through the front member will be refracted at the curved outer zone of the front surface of the rear member and then after two internal reflections respectively at the outer zone of the rear surface and at the central zone of the front surface will emerge from the rear member by refraction at the curved central zone of the rear surface thereof, the curvatures of the front and rear surfaces of the rear member being such that their sum lies between $1.0/F$ and $2.0/F$ and their difference between zero and $.30/F$, where F is the equivalent focal length of the objective.

10. An optical objective as claimed in claim 9, in which the rear surface of the front component and the front surface of the rear component of the front member are concave to the front and the latter is more deeply curved than the other surfaces of the front member.

11. An optical objective as claimed in claim 9, in which the paraxial power of the front member is numerically less than $.25/F$.

12. An optical objective as claimed in claim 9, in which the axial air separation between the rear surface of the front member and the front surface of the rear member is less than $1.2F$ and greater than $.05F$.

13. An optical objective as claimed in claim 9, in which the axial thickness of the rear member lies between $.25F$ and $.70F$.

14. An optical objective as claimed in claim 9, in which one of the surfaces of the front member is aspherical and consists of a surface of revolution generated by rotation about the X-axis (that is the optical axis of the objective) of a curve of the form $$x = a_2 y^2 + a_4 y^4 + \ldots \text{ higher even powers of } y$$

where $a_2$ and $a_4$ are constants determining the extent of departure from the tangent plane at the vertex of the surface and lie respectively between $+.5/F$ and $-.5/F$ and between $+.25/F^3$ and $-.25/F^3$.

WILLIAM MICHAEL WREATHALL.

References Cited in the file of this patent

UNITED STATES PATENTS

| Number | Name | Date |
|---|---|---|
| 2,141,884 | Sonnefeld | Dec. 27, 1938 |
| 2,336,379 | Warmisham | Dec. 7, 1943 |
| 2,350,112 | Houghton | May 30, 1944 |
| 2,378,301 | Kaprelian | June 12, 1945 |
| 2,380,887 | Warmisham | July 31, 1945 |
| 2,403,660 | Hayward | July 9, 1946 |
| 2,477,331 | Epstein | July 26, 1949 |
| 2,571,743 | Meyer | Oct. 16, 1951 |